Oct. 17, 1933.　　　　J. U. KOREE　　　　1,931,229
VEHICLE WHEEL RIM
Original Filed March 26, 1930
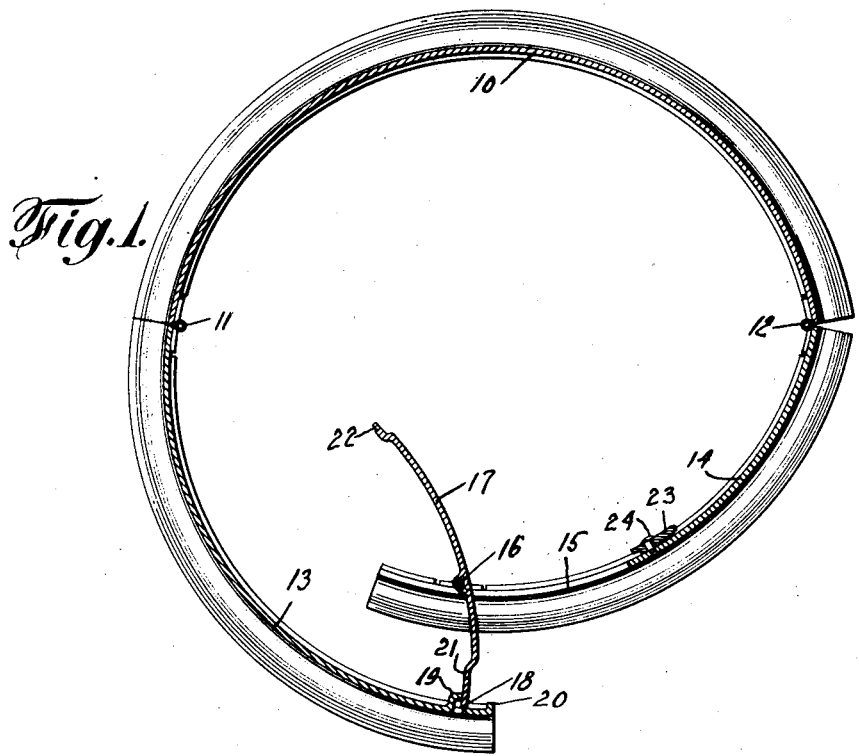
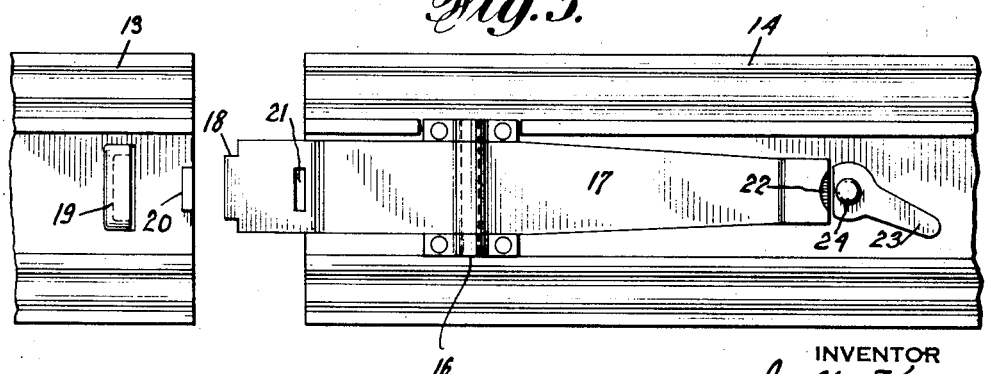
INVENTOR
J. U. Koree
BY
ATTORNEY Patented Oct. 17, 1933

1,931,229

UNITED STATES PATENT OFFICE

1,931,229

VEHICLE WHEEL RIM

Jean U. Koree, New York, N. Y.

Application March 26, 1930, Serial No. 439,063
Renewed September 15, 1933

1 Claim. (Cl. 301—32)

The present invention relates to improvements in demountable rims, and more particularly to that type where the rim is divided transversely into a plurality of sections which are hinged together, means being provided for moving the adjacent ends of the divided rim into and out of aligned relation.

The main object of the present invention is to provide a simple and efficient means for manipulating the ends of the rim, said means serving at the same time for locking the said ends in aligned relation.

Another object of the invention is to provide a rim of the type mentioned which is simple in construction, efficient in operation, durable in use and capable of manufacture on a commercial scale, or in other words one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claim and illustrated in the accompanying drawing, it being understood that many changes may be made in the size and proportion of the several parts and details of construction within the scope of the appended claim without departing from the spirit or sacrificing any of the advantages of the invention.

One of the many possible embodiments of the invention is illustrated in the accompanying drawing, in which:—

Figure 1 is a central section taken through a rim constructed in accordance with the present invention in a plane at right angles to the axis of the hub of the wheel on which it is to be mounted, one of the hinged sections of the wheel being shown in its collapsed condition; Fig. 2 is a similar section of a portion of the rim, said hinged secton being shown in aligned position; Fig. 3 is a plan view, looking from the center of the rim, of two hinged sections of the rim, the latter being shown in spaced relation.

The improved rim comprises a body portion 10, to the ends of which are pivoted at 11 and 12 two collapsible sections 13 and 14, respectively. In other words, the rim is divided transversely into a plurality of sections, the collapsible sections 13 and 14 being adapted to be moved into aligned relation, as shown in Fig. 2 of the drawing or out of aligned relation, as indicated in Fig. 1 of the drawing, the said collapsible sections moving around their hinges, but being prevented by the said hinges from moving laterally in relation to the body portion 10 of the rim. The rim is adapted to carry a pneumatic tire, not shown, which is adapted to be conveniently placed thereon and removed therefrom when the collapsible section 14 is moved into the position shown in Fig. 1 of the drawing.

The section 14 is provided with a longitudinal slot 15 and has pivoted to it adjacent its free end, at 16, a lever 17, the free end of the shorter arm of which is reduced in width, as shown at 18, said reduced end being adapted to be seated in a keeper 19, which is formed upon the hinged section 13 adjacent its free end. On the free end of the last-mentioned section is formed a lug 20, which is adapted to be seated in an aperture 21 in the lever 17. In the end portion of the longer arm of the lever 17 is formed a recess 22, for co-operation with a latch 23, that is pivoted at 24 to the hinged section 14 of the rim.

The operation of the rim is as follows: Assuming that the elements are in the positions shown in Fig. 1 of the drawing, it is obvious that a tire may be conveniently placed onto the rim. When then the lever 17 is taken hold of by its longer arm and the latter is forced toward the periphery of the rim, the section 14 is moved into alignment with the section 13, the keeper 19 acting as a fulcrum point, around which the lever is adapted to swing. When the sections 13 and 14 are in alignment, the lever 17 is seated practically throughout its whole length in the slot 15 and the free end of the shorter arm thereof in the keeper 19. When then the latch 23 is moved into engagement with the lever 17, in which position a portion of the said latch is seated in the lever recess 22, the movable sections 13 and 14 are fixed in aligned position, retaining the tire on the rim. In order to dismount the tire from the rim, the operations above described are performed in the reverse order.

What I claim is:—

A manipulating structure for a wheel rim of the type including a body portion and two collapsible sections hinged thereto and in which the free ends of the said collapsible sections are adapted to abut each other end to end, comprising a curved lever having an offset portion at each end thereof and pivoted to one of said sections for moving the same into or out of alignment with the other hinged section, said lever overlapping the meeting ends of said sections when the latter are in alignment and thereby being adapted to lock the same against movement, the section carrying said lever being provided with a longitudinal slot which is adapted to receive said lever when the latter is in its locking overlapping position, a latch on the lever carrying section adapted to engage one of said offset portions of said lever, a hollow keeper on the other hinged section into which the other offset portion of said lever slides for preventing movement of said lever when the latter is in its locking overlapping position and also serving as the means whereby the said lever is adapted to engage the keeper carrying section and thereby forming a fulcrum for said lever when the latter is swung toward overlapping locking position, and a lug on that hinged section which is provided with said keeper, said lever being provided with an aperture into which said lug is adapted to enter when said lever is swung toward locking position.

JEAN U. KOREE.